US012432477B2

(12) United States Patent
Hertkorn et al.

(10) Patent No.: US 12,432,477 B2
(45) Date of Patent: Sep. 30, 2025

(54) DEVICE FOR DETECTING AIRBORNE SOUND FOR AUTOMOTIVE APPLICATIONS, METHOD FOR THE PRODUCTION THEREOF, AND AUTOMATED DRIVING SYSTEM COMPRISING SUCH A DEVICE

(71) Applicant: ZF Friedrichshafen AG, Friedrichshafen (DE)

(72) Inventors: Michael Hertkorn, Bodolz (DE); Jens Giesler, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 406 days.

(21) Appl. No.: 18/252,014

(22) PCT Filed: Oct. 21, 2021

(86) PCT No.: PCT/EP2021/079181
§ 371 (c)(1),
(2) Date: May 5, 2023

(87) PCT Pub. No.: WO2022/096273
PCT Pub. Date: May 12, 2022

(65) Prior Publication Data

US 2024/0015429 A1 Jan. 11, 2024

(30) Foreign Application Priority Data

Nov. 6, 2020 (DE) ......................... 102020213964.4

(51) Int. Cl.
*H04R 1/04* (2006.01)
*H04R 1/08* (2006.01)
(Continued)

(52) U.S. Cl.
CPC ............... *H04R 1/086* (2013.01); *H04R 1/04* (2013.01); *H04R 1/2876* (2013.01); *H04R 3/00* (2013.01);
(Continued)

(58) Field of Classification Search
CPC ........ H04R 1/086; H04R 1/04; H04R 1/2876; H04R 3/00; H04R 19/04; H04R 2499/13
(Continued)

(56) References Cited

U.S. PATENT DOCUMENTS

2005/0220448 A1 10/2005 Tei et al.
2013/0223656 A1 8/2013 Iuchi
2021/0352393 A1* 11/2021 Diego Regla .......... H04R 1/086

FOREIGN PATENT DOCUMENTS

DE 10 2014 223 881 A1 5/2016
DE 10 2016 006 802 A1 12/2016
(Continued)

OTHER PUBLICATIONS

International Search Report and Written Opinion of the International Search Authority mailed Jan. 25, 2022 in International Application No. PCT/EP2021/079181 (English and German languages) (12 pp).
(Continued)

*Primary Examiner* — George C Monikang
(74) *Attorney, Agent, or Firm* — Crowell & Moring LLP

(57) ABSTRACT

A device for detecting airborne sound for use in automobiles may include an acoustic sensor, a protective screen for protecting the device against the ingress of coarse foreign matter, an acoustically permeable, hydrophobic and/or lipophobic first membrane, which is placed behind the protective screen in the airflow direction such that when a stream of water enters the opening, the water flows past the first membrane and out of the opening, a sound chamber
(Continued)

parallel to the axial axis, wherein a length of the sound chamber is less than 10 mm, preferably less than 6 mm, particularly preferably less than 3 mm, and a printed circuit board comprising components and their connections for preprocessing analog or digital signals from the acoustic sensor, and wherein the acoustic sensor is located on one side of the printed circuit board.

20 Claims, 4 Drawing Sheets

(51) Int. Cl.

| | |
|---|---|
| ***H04R 1/28*** | (2006.01) |
| ***H04R 3/00*** | (2006.01) |
| ***H04R 19/04*** | (2006.01) |

(52) U.S. Cl.
CPC ........ *H04R 19/04* (2013.01); *H04R 2201/003* (2013.01); *H04R 2499/13* (2013.01)

(58) Field of Classification Search
USPC .................................................... 381/86, 122
See application file for complete search history.

(56) References Cited

FOREIGN PATENT DOCUMENTS

| | | |
|---|---|---|
| DE | 21 2015 000 188 U1 | 4/2017 |
| DE | 10 2018 222 768 B3 | 11/2019 |
| DE | 10 2019 206 329 A1 | 11/2020 |
| DE | 10 2019 206 331 A1 | 11/2020 |
| JP | 2004-312156 | 11/2004 |
| JP | 2019-149698 | 9/2019 |

OTHER PUBLICATIONS

Office Action dated Aug. 9, 2022 for German Patent Application No. 10 2020 213 964.4, note: pp. 1 and 2 are English language Explanations to Section C. Result of Determination Document (18 pp.).

* cited by examiner

DEVICE FOR DETECTING AIRBORNE SOUND FOR AUTOMOTIVE APPLICATIONS, METHOD FOR THE PRODUCTION THEREOF, AND AUTOMATED DRIVING SYSTEM COMPRISING SUCH A DEVICE

RELATED APPLICATIONS

This application is a filing under 35 U.S.C. § 371 of International Patent Application PCT/EP2021/079181, filed Oct. 21, 2021, and claiming priority to German Patent Application 10 2020 213 964.4, filed Nov. 6, 2020. All applications listed in this paragraph are hereby incorporated by reference in their entireties.

BACKGROUND AND BRIEF DESCRIPTION

The invention relates to a device for detecting airborne sound for automotive applications, a method for the production thereof, and an automated driving system comprising such a device.

Acoustic sensors for detecting external sounds in a vehicle are known from the prior art. By way of example, DE 10 2016 006 802 A1 discloses a method and device for detecting at least one type of siren from an emergency vehicle.

The German patent application with the file number 10 2019 206 331.4 discloses a device for detecting airborne sound for automotive applications comprising a flow bypass placed between a protective screen and a first membrane in the device. The flow bypass conducts liquids and/or foreign matter entering the device through the airflow away from the first membrane and out of the device. A sound chamber in the device and the flow bypass are formed by an inflow component. The inflow component comprises a bulge. The bulge comprises a hollow chamber formed along the axial axis, which forms the sound chamber. The inflow component is joined to the protective screen such that the flow bypass is formed by an empty space between the inflow component and the protective screen. This means that the flow bypass is formed between the protective screen and the inflow component.

The invention is based on the realization that the flow bypass results in very loud sounds caused by wind, and can only be used in a vehicle at speeds of up to about 50 km/h.

The object of the invention is therefore to create a device for detecting airborne sounds for use in the automotive industry, in particular a device in which the results are not affected when a vehicle is travelling at high speeds.

The following definitions and different embodiments all relate to the subject matter of the invention.

The device according to the invention is intended for use in automobiles for detecting airborne sound in which there are airflows between the device and a source of the sound. The device solves the problem addressed by the invention by means of a targeted adjustment of the individual components in the device to one another. One of the components in the device is an acoustic sensor. The device also has a protective screen that protects the device against coarser foreign matter. The protective screen has at least one opening through which airborne sound enters the device. The opening is offset axially to an axial axis of the device. The device also has an acoustically permeable, hydrophobic and/or lipophobic first membrane. The first membrane is placed behind the protective screen in the direction of airflow such that if water flows into the opening, it passes by the membrane and back out of the opening. The device also comprises a sound chamber parallel to the axial axis, in which the first membrane is located at its first end in the direction of airflow, and the acoustic sensor is located at its second end. The sound chamber is protected by the first membrane from the effects of moisture and foreign matter. The sound chamber in the device according to the invention is shorter than the device disclosed in the patent application with the file number 10 2019 206 331.4. According to the invention, the length of the sound chamber is less than 10 mm, preferably less than 6 mm, particularly preferably less than 3 mm. The diameter, length, volume, shape and/or material properties of the sound chamber are such that the characteristic modes of the device are greater than 8 kHz, preferably greater than 10 kHz. The device also contains a printed circuit board. The printed circuit board is populated with components connected for preprocessing analog or digital signals from acoustic sensors. The components are designed for analog or digital signal processing and/or for filtering, reversing phases, compression, and/or amplification. The acoustic sensor is also located on one side of the printed circuit board.

By way of example, the acoustic sensor is located on the back of the printed circuit board in relation to the direction of the airflow. In this case, the opening through which the acoustic sensor receives sound is on the side of the printed circuit board populated by components, and there is a hole in the printed circuit board through which sound enters. The acoustic sensor can also be placed on the front of the printed circuit board in relation to the direction of the airflow. In this case, the sound entry opening on the acoustic sensor is on the side of the acoustic sensor lying opposite the side of the printed circuit board populated with components.

What distinguishes the device from known microphones is the functionality and airborne sound detection, and the conversion thereof in the difficult environmental and airflow conditions encountered with applications in the automotive industry. By way of example, when a vehicle is travelling, an airstream is formed as a function of the speed of the vehicle, resulting in relative airflows acting on the device. The device according to the invention is able to detect airborne sounds and convert them in relative airflows. As a result of the targeted adjustment of the individual components, the device according to the invention can be used in diverse environmental conditions, such as when it is raining or windy, or in airstreams occurring at high speeds, for example. At the same time, the external acoustic signal is dampened as little as possible by the device according to the invention. The environmental conditions arise through the use of the acoustic sensor in automotive applications such as street traffic, for example. The environmental conditions are also caused by the placement of the acoustic sensors, e.g. on moving and/or stationary objects exposed to water, so-called open air objects such as vehicles. As such, water, water streams, dirty water, snow, ice, dust, salt, such as road salt, high and/or low temperatures, high or low humidity, and/or higher relative airstreams that may occur when the vehicle is moving, are some of the effects under which the acoustic sensor has to function. The device according to the invention can detect airborne sound and convert it into electrical signals in a temperature range of −50° C. to +90° C., e.g. −30° C. to +70° C. The device according to the invention is distinctive in that the individual components in the device, e.g. the acoustic sensor, the protective screen, the opening for airborne sound entry, i.e. the airborne sound entry opening, the first membrane, and the sound chamber are adjusted electronically and mechanically to one another, taking air and/or structure-borne sound, aeroacoustics, fluid dynamics and hydrodynamics into account.

The shorter sound chamber has the advantage that characteristic modes of the device lie above 8 kHz according to one aspect of the invention, and are relatively less pronounced, e.g. only ±5 dB in comparison to up to ±40 dB in a longer sound chamber. With longer sound chambers, strong resonances are generated at ca. 5 kHz, with up to ±40 dB, resulting in an acoustic signal that may not be of any use. The shortened sound chamber results in acoustic signals that are more useful.

The flow bypass in the device disclosed in the German patent application with the file number 10 2019 206 331.4 results in loud wind noise, because air flows through the flow bypass. By eliminating the flow bypass, the wind noise is drastically reduced. The device with the flow bypass could only be used at speeds of up to 50 km/h. The device according to the invention even hears acoustic signals at over 100 km/h, without wind noise drowning them out.

Any stream of water passing over the first membrane in the device according to the invention is flushed out toward the front. This results in a high flow of water in front of the first membrane, which has a cleansing effect thereon. The forces acting on the first membrane are kept to a minimum by the direction in which the water flows.

The acoustic sensor in the device has a housing. The term, “acoustic sensor,” refers to both the acoustic sensor that forms a component of the device, as well as the overall device.

An acoustic sensor that detects mechanical vibrations, such as those caused by airborne soundwaves, can convert them into a signal that can be processed, e.g. an electric signal in the form of a voltage. The acoustic sensor has an analog and/digital signal output. The conversion takes places in two steps. In a first acoustic-mechanical conversion step, the airborne sound is converted into the movement of an object according to a certain reception principle. In the second mechanical-electrical conversion step, the movement of the object is converted into the electrical signal according to a certain conversion principle. Examples of acoustic sensors are an assembly composed of a magnet and an electric coil, microphone, accelerometer, piezoelectric sensor, or strain gauges. A microelectromechanical system, MEMS, comprising an arrangement of semiconductor elements that record vibrations can also be used as an acoustic sensor.

The protective screen is a screen that provides mechanical protection. The protective screen is constructed such that coarse foreign matter, i.e. particles with diameters of at least 2 mm, e.g. dirt, such as mud, dust, soot, salt, rocks, insects, or other airborne particles, cannot get into the device.

The opening for air intake is placed in the protective screen such that no direct stream and/or particle flow can act on the first membrane in the axial direction of the sensor. As a result, the first membrane is protected by the placement and/or shape of the opening. According to one aspect of the invention, the opening or openings are approximately 2 mm wide and 5 mm long.

Airborne soundwaves can pass through the first membrane. The sound chamber is protected against moisture and particles by the hydrophobic and/or lipophobic properties thereof. The first membrane is a microporous membrane according to another aspect of the invention. “Microporous” means that the membrane has 1.3×109 pores/cm2. Membranes of this type are particularly watertight, resulting in protection level of at least IPX4K according to the IP code (ingress protection code). According to one aspect of the invention, the first membrane is designed to obtain a protection level of IP69K. The numeral 6 in IP69K means that it is entirely impermeable, thus providing protection against the ingress of solid bodies and dust. “9K” relates to protection against the ingress of water in high pressure or steam cleaning. This is particularly advantageous with regard to protection in automotive applications.

The type of protection depends on the environmental conditions in which the components are to be used. The various protected systems are categorized into corresponding types of protection, so-called ingress protection codes (IP codes). The standard ISO 20653:2013 road vehicles IP code refers to the protection against foreign matter, water, and electrical contact for road vehicles. IP6XK offers protection against pressurized water streams, specifically for vehicles.

“Airflow direction” refers to the direction that air flows through the device, or the direction of airflow in relation to the vehicle in which the device is installed. When the device is installed at the rear of a vehicle, such that the protective screen opens toward the back, the roles of the first end of the sound chamber and the second end of the sound chamber are reversed.

The sound chamber conducts the airborne soundwaves in a targeted manner toward the acoustic sensor. The size of the sound chamber is such that no, or as little and weak as possible, characteristic modes are generated in the frequency range in which the acoustic sensor can be used. The basis for this targeted sizing is substantially the shortened length, and the diameter, volume and shape of the sound chamber.

The printed circuit board can also be referred to as a printed wiring board or PCB. The components populating the printed circuit board are logic modules such as ASICS or FPGAs. By way of example, one component forms a high pass filter, that allows airborne soundwaves with frequencies greater than 300 Hz to pass. The dynamic range of a signal can be reduced using compressor functions. The components are attached directly to the surface of the printed circuit board, e.g. soldered thereto, and are also referred to as surface mounted devices, or SMDs. The opening in the printed circuit board forms a hole in the printed circuit board through which airborne sound can enter the acoustic sensor, which is located on the back of the printed circuit board in the direction of airflow. The back of the printed circuit board in the airflow direction is the surface of the printed circuit board on which the components and the acoustic sensor are located. When installed at the rear of a vehicle, such that the protective screen faces toward the rear of the vehicle, the front of the printed circuit board in the airflow direction is the surface of the printed circuit board on which the components and the acoustic sensor are located.

According to one aspect of the invention, the acoustic sensor comprises a microphone, e.g. a MEMS microphone. The microphone comprises a microphone capsule and a converter. The acoustic-mechanical conversion takes place in the microphone capsule. The microphone capsule comprises a membrane, for example, that vibrates in response to airborne sound. The mechanical-electrical conversion takes place in the converter. The converter is an electrodynamic converter, for example, such as that in a dynamic microphone, or an electrostatic converter, such as that in a condenser microphone.

According to another aspect of the invention, the shape and/or material properties of the protective screen are adjusted in order to protect the first membrane, sound chamber, and/or acoustic sensor against dynamic and/or static forces, resulting from airstreams or the weather, for example. The protective screen and the openings in the protective screen can be rotationally symmetrical, for example. The protective screen can be made of plastic, and shaped such that it offers a protection level of at least IP6XK. This results in a mechanical protection of the device, thus protecting the acoustic sensor against such mechanical effects.

By way of example, the protective screen comprises an open-pore material, e.g. a foam such as open-pore polyurethane foam. Wind and/or water absorption can be adjusted by altering the size of the pores. Foams have a very low density, and can be easily processed. Foams can be made particularly easily from polyurethane. Open-pore polyurethane foam is also referred to as filter foam. Filter foam is particularly effective in wind absorption. Filter foam is classified according to the size and number of pores. The number of pores refers to the number of pores per inch, PPI. The protective screen here comprises a filter foam in the range of 10 to 80 PPI.

The protective screen can be replaced when it becomes dirty, according to another aspect of the invention, without having to replace the entire device.

According to another aspect of the invention, the device has a housing in which the printed circuit board is located. The housing protects the printed circuit board and its components from mechanical and/or thermal effects. The housing comprises fastening means, e.g. threaded fasteners, with which the housing and the device can be attached to a control unit or a vehicle.

According to another aspect of the invention, the printed circuit board is perpendicular or parallel to the axial axis of the device. If it is parallel, the second end of the sound chamber is located in a radial extension of an outer surface of the sound chamber. If it is parallel, the acoustic sensor, e.g. the microphone and/or microphone capsule are coupled to the sound chamber, parallel to the axial axis of the device. When the printed circuit board is parallel to the axial axis of the device, the acoustic sensor is perpendicular to the axial axis, i.e. it is coupled to the sound chamber tangentially. The acoustic sensor is particularly effective in the parallel placement.

According to another aspect of the invention, the printed circuit board comprises a plug-in connection for connecting the device to an electronic control unit. The control unit is designed to locate and/or classify the source of the sound on the basis of the signal from the acoustic sensor. The electronic control unit is a control unit, for example, that is only connected to the device. This means that the control device only receives and evaluates signals from the acoustic sensor. The control unit executes an intelligent algorithm in an artificial neural network, such as a convolutional neural network, for example, trained to locate and/or classify sounds. The evaluated signals are then sent in a vehicle electrical system to other control units in the vehicle, e.g. an ADAS or AD domain ECUs, or actuators in the vehicle according to one aspect of the invention. By way of example, the device is connected to a CAN bus or an ethernet bus in the vehicle.

According to another aspect of the invention, the device comprises an elastic seal with which the acoustic sensor is coupled to the sound chamber and/or the printed circuit board. The seal compensates for geometric tolerances when assembling the device. The elasticity ensures that the acoustic sensor, in particular the microphone capsule and/or printed circuit board, is decoupled from any structure-borne sound. The elasticity also ensures that the sound chamber is connected to the microphone capsule in an acoustically insulated manner.

According to another aspect of the invention, the device has a decoupling component for dampening vibrations and/or decoupling from structure-borne sound. The decoupling component is located where the device is coupled to a component in which the device can be installed and/or with which the device can be mechanically supported. The decoupling component is made of a two-component material, which generates an acoustic and/or vibrational impedance difference. The two-component substance comprises a relatively soft material with a relatively lower impedance and a relatively hard material with a relatively higher impedance. The soft material is located in front of the hard material in the direction of the airflow. The impedance difference is conducted through the entire bearing surface between the protective screen and the decoupling component. The decoupling component is a molded part, for example. According to another aspect of the invention, the protective screen and the decoupling component form a single component. By way of example, the protective screen and the decoupling component are made from an injection molded part. According to another aspect of the invention, the decoupling component is made of vibration-dampening materials of different densities, e.g. a mixture of polyurethane foams. The decoupling component can withstand high mechanical loads and has good insulating properties. This component renders the device impervious to vibrations, such that it is particularly suitable for use in the automotive industry.

According to another aspect of the invention, the device has a second membrane with which the device is ventilated. The second membrane equalizes air pressure in the device. If the device is used on the outside of a vehicle, the airstreams passing over the surface of the vehicle exert pressure on the device, e.g. on the acoustic sensor. The second membrane equalizes this pressure. The second membrane also ensures that condensation does not accumulate inside the device.

The method according to the invention for producing the device according to the invention comprises the following steps:

- an acoustic sensor according to the invention is coupled to a printed circuit board according to the invention by means of a seal according to the invention,
- the acoustic sensor is coupled to a smaller second surface of an airstream component according to the invention by means of the seal at a second end of a sound chamber according to the invention,
- a first membrane according to the invention is placed at a first end of the sound chamber, which has a larger second surface,
- a protective screen according to the invention is placed in a decoupling component according to the invention, and
- the housing for the acoustic sensor obtained after the preceding steps is placed in a component according to the invention in which the housing can be installed and/or with which the housing can be mechanically supported.

According to the method for the invention, the acoustic sensor is coupled to the back of the printed circuit board in the direction of the airflow, which is the surface of the printed circuit board populated with the electronic components. According to the invention, the printed circuit board is perpendicular or parallel to the axial axis of the device. In the parallel position of the printed circuit board, the second end of the sound chamber is located in a radial extension of the outer surface of the sound chamber.

According to another aspect of the invention, the housing is mounted on the inside of a front bumper or rear bumper on the vehicle.

According to another aspect of the invention, the protective screen and decoupling component are produced as a molded part, e.g. an injection molded part.

In another aspect of the invention, the device is produced with the method according to the invention.

The method according to the invention allows the housing, in particular the housing according to the invention, to be installed in or on the vehicle during the manufacturing process. The method also allows the housing according to the invention, in particular in which the acoustic sensors are integrated, to be efficiently retrofitted to an existing vehicle. The invention therefore can be retrofitted to existing vehicles. The housing is preassembled in accordance with the steps of the method for this, and then placed on the vehicle. According to one aspect of the invention, the housing is placed inside a front or rear bumper on the vehicle.

The automated vehicle according to the invention comprises a device according to the invention or an assembly composed of numerous such devices, or a device produced with the method according to the invention. The device is designed according to the invention such that it can be used at numerous installation positions in or on the vehicle.

According to one aspect of the invention, the device according to the invention, or an assembly composed of numerous such devices, can be placed in at least one wheel housing in the vehicle, preferably in front wheel housings, more preferably in each wheel housing. By placing it in wheel housings, sounds caused by the road surface, e.g. when there is rainwater thereon, are detected particularly effectively. According to another aspect of the invention, the device according to the invention or an assembly of numerous such devices can be installed in a front and/or rear bumper on the vehicle. According to another aspect of the invention, the vehicle has the devices according to the invention in wheel housings and front and/or rear bumpers on the vehicle.

The device is integrated on the outside of the vehicle, e.g. in wheel housings and/or bumpers, by means of a component according to the invention, in which the device can be installed and/or the device can be mechanically supported. The device can also be connected for signal transfer to an ADAS or AD domain ECU in the vehicle by means of a plug-in connection according to the invention.

By way of example, numerous devices according to the invention can be offset to one another, e.g. in a circle, rectangle, or line. By way of example, the assembly can comprise four devices that are adjacent to one another. Such an assembly is surprisingly good for recording sounds, and can be obtained relatively easily.

The vehicle is a passenger automobile, truck, or people mover, for example. The vehicle comprises technical equipment for a self-driving, i.e. driverless, or fully automated, autonomous vehicle. The ADAS, i.e. advanced driver assistance system, or AD, i.e. autonomous driving, domain ECU, i.e. electronic control unit, observes a vehicle environment using environment detection sensors, derives a trajectory plan therefrom, and determines corresponding control signals that are sent to the vehicle actuators in order to regulate the longitudinal and/or lateral guidance of the vehicle. The acoustic sensor in the device according to the invention is one example of an environment detection sensor. Other environment detection sensors are optical sensors, e.g. cameras, lidar sensors, or radar sensors. According to one aspect of the invention, the signals from the acoustic sensors are combined with signals from other environment detection sensors in order to locate and/or classify objects in road traffic.

The component has fastening means for attaching the device to the vehicle. By way of example, the device is installed inside the front bumper, the rear bumper, or in front and/or rear wheel housings. As a result, the device can be retrofitted to existing road vehicles. The device can also be secured to the outside of the vehicle, e.g. on its body.

According to another aspect of the invention, a first set of devices in placed in the left front part of the vehicle, a second set is placed in a right front part of the vehicle, a third set is placed in a left rear part of the vehicle, and/or a fourth set is placed in a right rear part of the vehicle, e.g. in bumpers and/or wheel housings. The placement corresponds to a specific positioning thereof. This placement with four sets makes it possible to detect environment sounds over 360°. By way of example, the sets can each contain four devices that are adjacent to one another.

According to another aspect of the invention, the device is integrated in a stationary object in a traffic infrastructure, e.g. a traffic light or a building, by means of the component according to the invention, in which the device can be installed and/or with which the device can be mechanically supported.

BRIEF DESCRIPTION OF THE DRAWINGS

Certain aspects shall be explained below in reference to the drawings. Therein.

Identical reference numerals indicate the same or functionally similar parts in the drawings. For purposes of clarity, only those parts that are relevant are indicated in the individual figures.

DETAILED DESCRIPTION OF THE DRAWINGS

Figure 1:
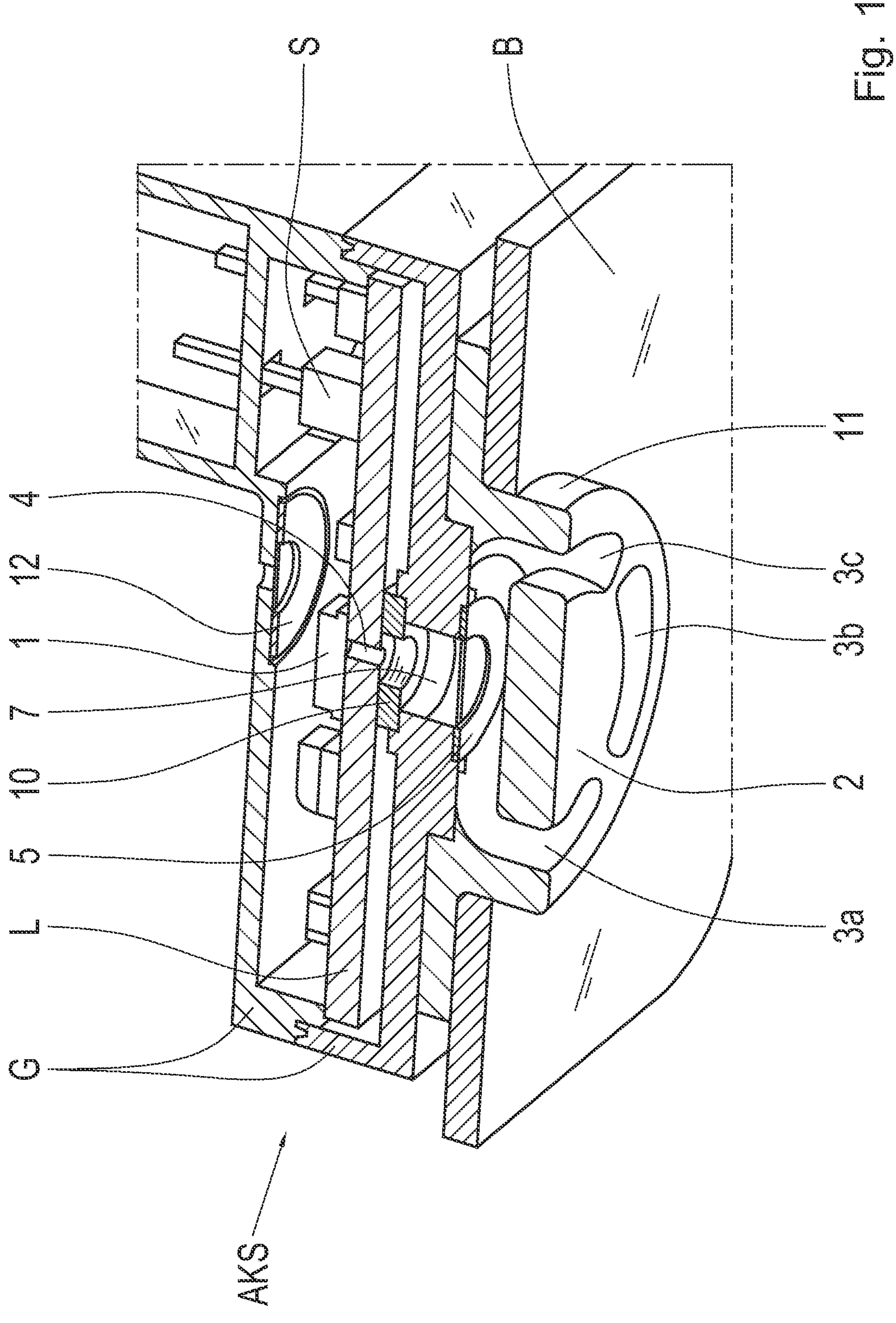
FIG. 1 shows a perspective view of an exemplary embodiment of the device according to the invention.
Figure 2:
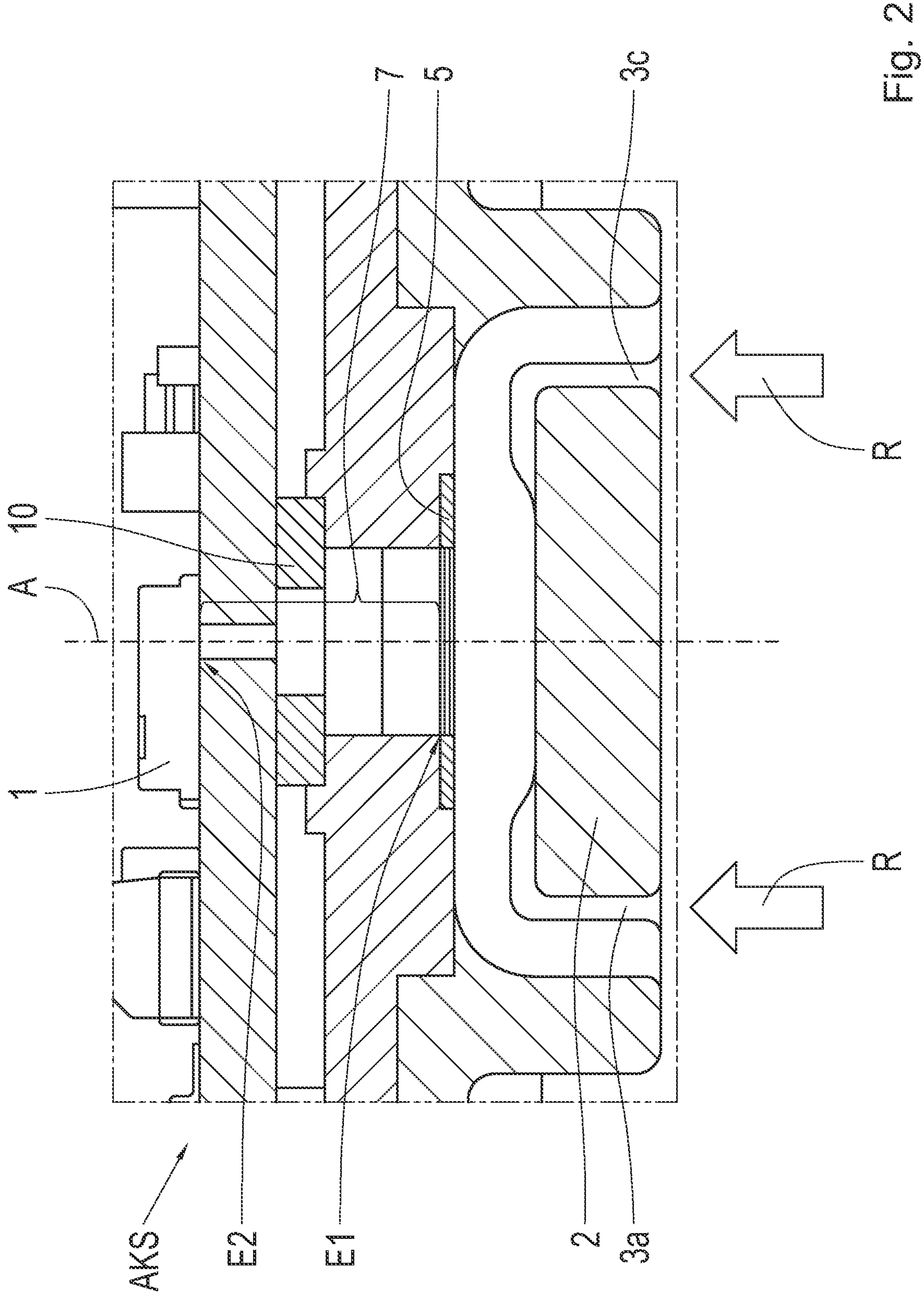
FIG. 2 shows a first cutaway view of the exemplary embodiment shown in FIG. 1.
Figure 3:
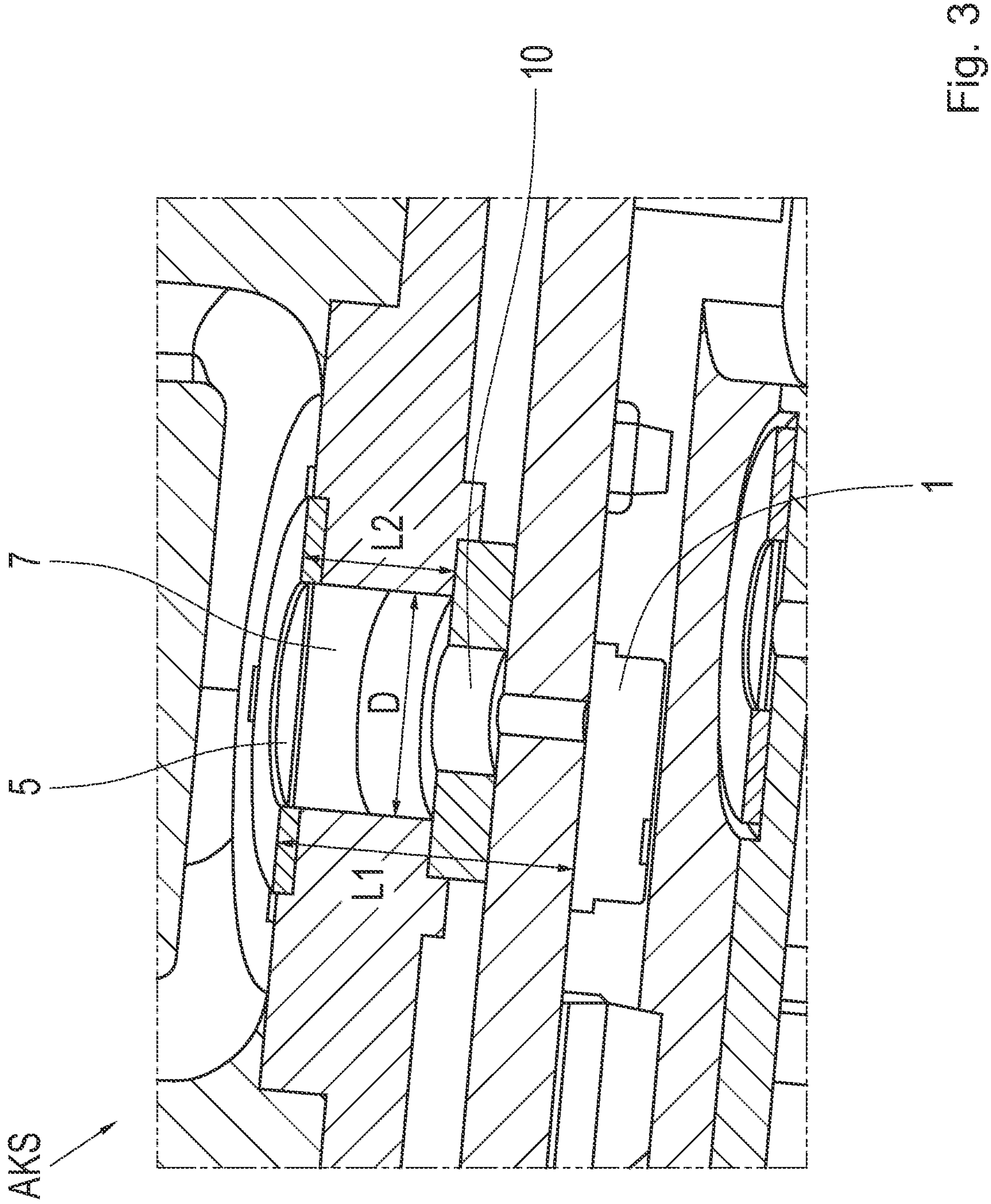
FIG. 3 shows a second cutaway view of the exemplary embodiment shown in FIG. 1.

In FIGS. 1, 2 and 3, a printed circuit board L is placed in a device AKS, such that it is perpendicular to an axial axis A of the device AKS.

Figure 5:
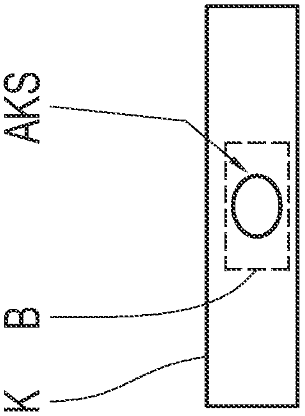
FIG. 5 shows an exemplary embodiment of an outside of the vehicle shown in FIG. 4.
Figure 4:
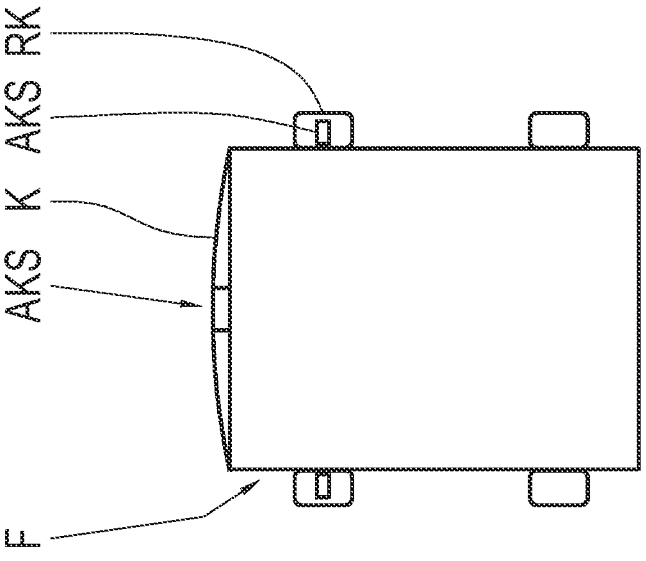
FIG. 4 shows an exemplary embodiment of an automated vehicle according to the invention.

The device AKS comprises a component B. The component B supports the device AKS on the outside K of a vehicle F, as shown in FIGS. 4 and 5. The component B is an injection molded part, for example, or a part produced with an additive process, e.g. a 3D printing process. The outside K of the vehicle F is a part of a body of the vehicle F, for example, such as a bumper. The bumper can either be at the front or back of the vehicle.

The component B has a round hole. A protective screen 2 is placed in this hole. The protective screen 2 is coupled to the component B by a decoupling component 11, as shown in FIGS. 1, 2 and 3. By way of example, the protective screen 2 and the decoupling component 11 are made from an injection molded part. The protective screen 2 in FIGS. 1, 2, and 3 comprises four symmetrically placed slots, three of which slots 3*a*, 3*b*, 3*c* are shown. The openings 3*a*, 3*b*, 3*c* are entry openings in the device AKS for airborne soundwaves. The airborne soundwaves enter the device AKS in the airflow direction R. The openings 3*a*, 3*b*, 3*c* are offset axially to an axial axis A in the device AKS.

The airborne soundwaves are conducted through a sound chamber 7 to an acoustic sensor 1. The acoustic sensor 1 is placed on the back of the printed circuit board L in the airflow direction R, which is the surface of the printed circuit board L populated with electronic components. A first membrane 5 is placed at the first end E1 of the sound chamber 7. The acoustic sensor 1 is placed in the extension of the second end E2 of the sound chamber 7.

The acoustic sensor 1 is an electroacoustic sensor, e.g. a microphone. The acoustic sensor 1 in the exemplary embodiments is a MEMS microphone. FIGS. 1, 2, and 3 each show a microphone capsule. The acoustic sensor 1 is coupled to the sound chamber 7 and a printed circuit board L by means of a seal 10.

The printed circuit board L is in a housing G. The housing G is an electronics housing. The printed circuit board L is populated with components and their connections for preprocessing analog or digital signals from the acoustic sensor 1. The printed circuit board L also has plug-in connections S for connecting the printed circuit board L and therefore the device AKS to an electronic control unit for signal transfer.

The housing G has two membranes 12 that form ventilation membranes for equalizing the pressure in the housing G and preventing a buildup of condensation in the housing G. The housing G also has fastening means, e.g. threaded fasteners.

FIG. 3 shows the sound chamber 7 in detail. A first length L1 of the sound chamber 7, in which the sound chamber 7 extends from the first membrane 5 to the acoustic sensor 1, is 5.350 mm. Without the printed circuit board L and without the seal 10, the sound chamber 7 has a second length L2 of 2.700 mm, by way of example. The second length L2 of 2.700 mm is the minimum if a certain housing wall thickness and tolerances when installing the printed circuit board L, as well as the concept with the component B and the protective screen 2, are maintained. In theory, shorter second lengths L2 are possible. The diameter D of the sound chamber 7 is a maximum of 3.915 mm, by way of example. The diameter D is less than 3.915 mm.

FIG. 4 shows a passenger automobile as an example of a vehicle F. The device AKS is integrated on the outside K of the vehicle F, e.g. in a bumper. The device AKS is held in the bumper by the component B, as shown in FIG. 5. There is also a device AKS in each of the front wheel housings RK in the vehicle F.

Figure 6:
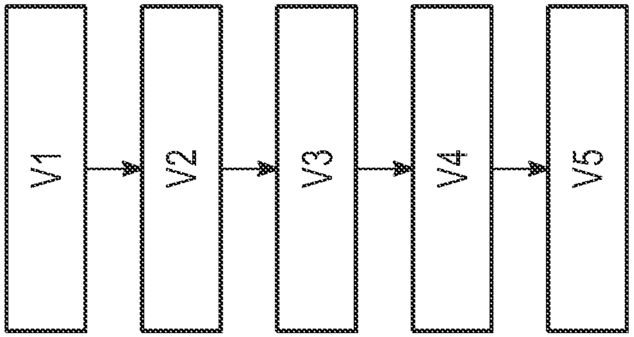
FIG. 6 shows an exemplary embodiment of the method according to the invention.

FIG. 6 shows an exemplary sequence for the method. Another aspect involves a different sequence of the individual steps, e.g. V5, V4, V3, V2, V1.

In step V1, the acoustic sensor 1 is coupled to the printed circuit board L using the seal 10. In step V2, the acoustic sensor 1 is coupled to the second end E2 of the sound chamber 7, which has a smaller second surface by means of the seal 10. In step V3, the first membrane 5 is placed at the first end E1 of the sound chamber 7, which has a larger second surface. In step V4, the protective screen 2 is placed in the decoupling component 11. In step V5, the housing obtained in this manner, i.e. the device AKS, is placed in the component B, in which the housing can be installed and/or with which the housing can be mechanically supported.

REFERENCE SYMBOLS

1 acoustic sensor
2 protective screen
3*a* opening
3*b* opening
3*c* opening
4 printed circuit board hole
5 first membrane
7 sound chamber
L1 first length
L2 second length
D diameter
10 seal
11 decoupling component
12 second membrane
E1 first end
E2 second end
AKS device
A axial axis
R airflow direction
L printed circuit board
S plug-in connection
G housing
B component
V1-V5 steps of the method
F vehicle
RK wheel housing
K outside

The invention claimed is:

1. A device for detecting airborne sound for use in an automobile, wherein there are airflows between the device and a sound source, the device comprising:

an acoustic sensor, a protective screen for protecting the device against the ingress of coarse foreign matter, wherein the protective screen comprises at least one opening through which the airborne sound enters the device, wherein the opening is offset axially to an axial axis of the device;

a first membrane, which is placed behind the protective screen in the airflow direction such that when a stream of water enters the opening, the water flows past the first membrane and back out of the opening;

a sound chamber parallel to the axial axis, wherein on a first end of the sound chamber, the first membrane is located in the airflow direction, wherein the acoustic sensor is located at a second end of the sound chamber, wherein the sound chamber is protected by the first membrane against the effects of moisture and foreign matter, wherein a length of the sound chamber is less than 10 mm, and wherein at least one of a diameter, length, volume, shape and material property of the sound chamber are selected such that characteristic modes of the device are greater than 8 kHz;

and a printed circuit board, wherein at least one component of the printed circuit board configured for preprocessing analog or digital signals from the acoustic sensor is also configured for at least one of analog or digital signal processing, filtering, phase reversal, compression, and amplification, and wherein the acoustic sensor on one side of the printed circuit board.

2. The device according to claim 1, wherein the acoustic sensor comprises a microphone, which comprises a microphone capsule and a converter.

3. The device according to claim 1, wherein the shape and/or material properties of the protective screen are configured to protect the first membrane, the sound channel and/or the acoustic sensor against dynamic and/or stationary forces.

4. The device according to claim 1, wherein the printed circuit board comprises a plug-in connection for connecting the device to an electronic control unit, and wherein the control unit is designed to locate and/or classify the sound source based on the signal from the acoustic sensor.

5. The device according to claim 1, comprising an elastic seal for coupling the acoustic sensor to the sound chamber and/or the printed circuit board.

6. The device according to claim 1, comprising a decoupling component for dampening vibrations and/or decoupling structure-borne sounds, wherein the decoupling component is made from a two-component material, which generates an acoustic and/or vibrational impedance difference.

7. The device according to claim 1, comprising a second membrane for ventilating the device.

8. The device according to claim 1, wherein the first membrane is acoustically permeable.

9. The device according to claim 1, wherein the first membrane is hydrophobic.

10. The device according to claim 1, wherein the first membrane is lipophobic.

11. The device according to claim 1, wherein the length of the sound chamber is less than 6 mm.

12. The device according to claim 1, wherein the length of the sound chamber is less than 3 mm.

13. The device according to claim 1, wherein the characteristic modes of the device are greater than 10 KHz.

14. A method, comprising:

assembling a device for detecting airborne sound for use in automobile wherein there are airflows between the device and a sound source, the device comprising:

an acoustic sensor, a protective screen for protecting the device against the ingress of coarse foreign matter, wherein the protective screen comprises at least one opening through which the airborne sound enters the device, wherein the opening is offset axially to an axial axis of the device;

a first membrane, which is placed behind the protective screen in the airflow direction such that when a stream of water enters the opening, the water flows past the first membrane and back out of the opening;

a sound chamber parallel to the axial axis, wherein on a first end of the sound chamber, the first membrane is located in the airflow direction, wherein the acoustic sensor is located at a second end of the sound chamber, wherein the sound chamber is protected by the first membrane against the effects of moisture and foreign matter, wherein a length of the sound chamber is less than 10 mm, and wherein at least one of a diameter, length, volume, shape and material property of the sound chamber are selected such that characteristic modes of the device are greater than 8 kHz;

and a printed circuit board, wherein at least one component of the printed circuit board configured for preprocessing analog or digital signals from the acoustic sensor is also configured for at least one of analog or digital signal processing, filtering, phase reversal, compression, and amplification, and wherein the acoustic sensor on one side of the printed circuit board.

15. The method according to claim 14, wherein the acoustic sensor comprises a microphone, which comprises a microphone capsule and a converter.

16. The method according to claim 14, wherein the shape and/or material properties of the protective screen are configured to protect the first membrane, the sound channel and/or the acoustic sensor against dynamic and/or stationary forces.

17. The method according to claim 14, wherein the printed circuit board comprises a plug-in connection for connecting the device to an electronic control unit, and wherein the control unit is designed to locate and/or classify the sound source based on the signal from the acoustic sensor.

18. The method according to claim 14, the device comprising an elastic seal for coupling the acoustic sensor to the sound chamber and/or the printed circuit board.

19. The method according to claim 14, the device comprising a decoupling component for dampening vibrations and/or decoupling structure-borne sounds, wherein the decoupling component is made from a two-component material, which generates an acoustic and/or vibrational impedance difference.

20. The method according to claim 14, the device comprising a second membrane for ventilating the device.

* * * * *